(12) United States Patent
Sweeney

(10) Patent No.: US 10,760,889 B2
(45) Date of Patent: Sep. 1, 2020

(54) FAN BLADE MASKING/COATING CHECK INSPECTION TOOL

(71) Applicant: United Technologies Corporation, Farmington, CT (US)

(72) Inventor: James R. Sweeney, Huntsville, AL (US)

(73) Assignee: United Technologies Corporation, Farmington, CT (US)

( * ) Notice: Subject to any disclaimer, the term of this patent is extended or adjusted under 35 U.S.C. 154(b) by 218 days.

(21) Appl. No.: 16/129,117

(22) Filed: Sep. 12, 2018

(65) Prior Publication Data

US 2020/0080828 A1 Mar. 12, 2020

(51) Int. Cl.
*G01B 3/14* (2006.01)
*G01B 3/30* (2006.01)
*G01B 5/00* (2006.01)
*G01B 5/06* (2006.01)
*F01D 5/28* (2006.01)

(52) U.S. Cl.
CPC ............... *G01B 3/30* (2013.01); *G01B 5/003* (2013.01); *G01B 5/066* (2013.01); *F01D 5/288* (2013.01)

(58) Field of Classification Search
CPC .................................. G01B 3/30; G01B 3/50
USPC .......................................................... 33/563
See application file for complete search history.

(56) References Cited

U.S. PATENT DOCUMENTS

| | | | | |
|---|---|---|---|---|
| 4,322,887 A * | 4/1982 | Burton | ...................... | G01B 5/14 33/552 |
| 4,411,073 A * | 10/1983 | Ryan | ...................... | G01B 7/285 33/530 |
| 4,812,052 A * | 3/1989 | Adam | ...................... | G01N 3/18 219/634 |
| 6,910,278 B2 | 6/2005 | Holder | | |
| 7,772,314 B2 | 8/2010 | Fernihough et al. | | |
| 8,959,785 B2 * | 2/2015 | Craig | ...................... | F01D 25/28 33/543 |
| 9,650,902 B2 | 5/2017 | Billings et al. | | |
| 2004/0148793 A1 * | 8/2004 | Holder | .................. | F01D 21/003 33/562 |
| 2005/0217131 A1 * | 10/2005 | Varsell | ...................... | G01B 3/14 33/562 |

(Continued)

OTHER PUBLICATIONS

Extended European Search Report dated Jan. 29, 2020, received for corresponding European Application No. 19196580.5.

*Primary Examiner* — George B Bennett

(74) *Attorney, Agent, or Firm* — Kinney & Lange, P.A.

(57) ABSTRACT

A masking and coating check inspection tool for inspecting a masking and/or coating edge on a fan blade includes an elongate planar base having distal first and second ends, bottom surface, top face, length, width, and thickness. The length is greater than the width. A pillar perpendicular to the elongate planar base and projecting upward from the top face between the first and second ends has a first end datum, and a first masking check tolerance band disposed on the first end, configured to provide a pass/fail indication of the first masking edge with respect to the first end datum. The pillar can have second end datum and second masking check tolerance band on the second end configured to provide a pass/fail indication of a second masking edge with respect to the second end datum. The inspection tool can be used on root and platform masking/coating edges.

20 Claims, 4 Drawing Sheets

(56) References Cited

U.S. PATENT DOCUMENTS

| | | | |
|---|---|---|---|
| 2009/0030648 A1* | 1/2009 | Hunter | G01B 21/04 |
| | | | 702/152 |
| 2012/0276308 A1 | 11/2012 | Rebak et al. | |
| 2013/0167392 A1* | 7/2013 | Boyer | G01B 3/14 |
| | | | 33/562 |
| 2014/0150455 A1 | 6/2014 | Roberts, Jr. et al. | |
| 2015/0121991 A1 | 5/2015 | Christiansen | |
| 2016/0076868 A1* | 3/2016 | Feuillard | G01B 21/047 |
| | | | 33/833 |

\* cited by examiner

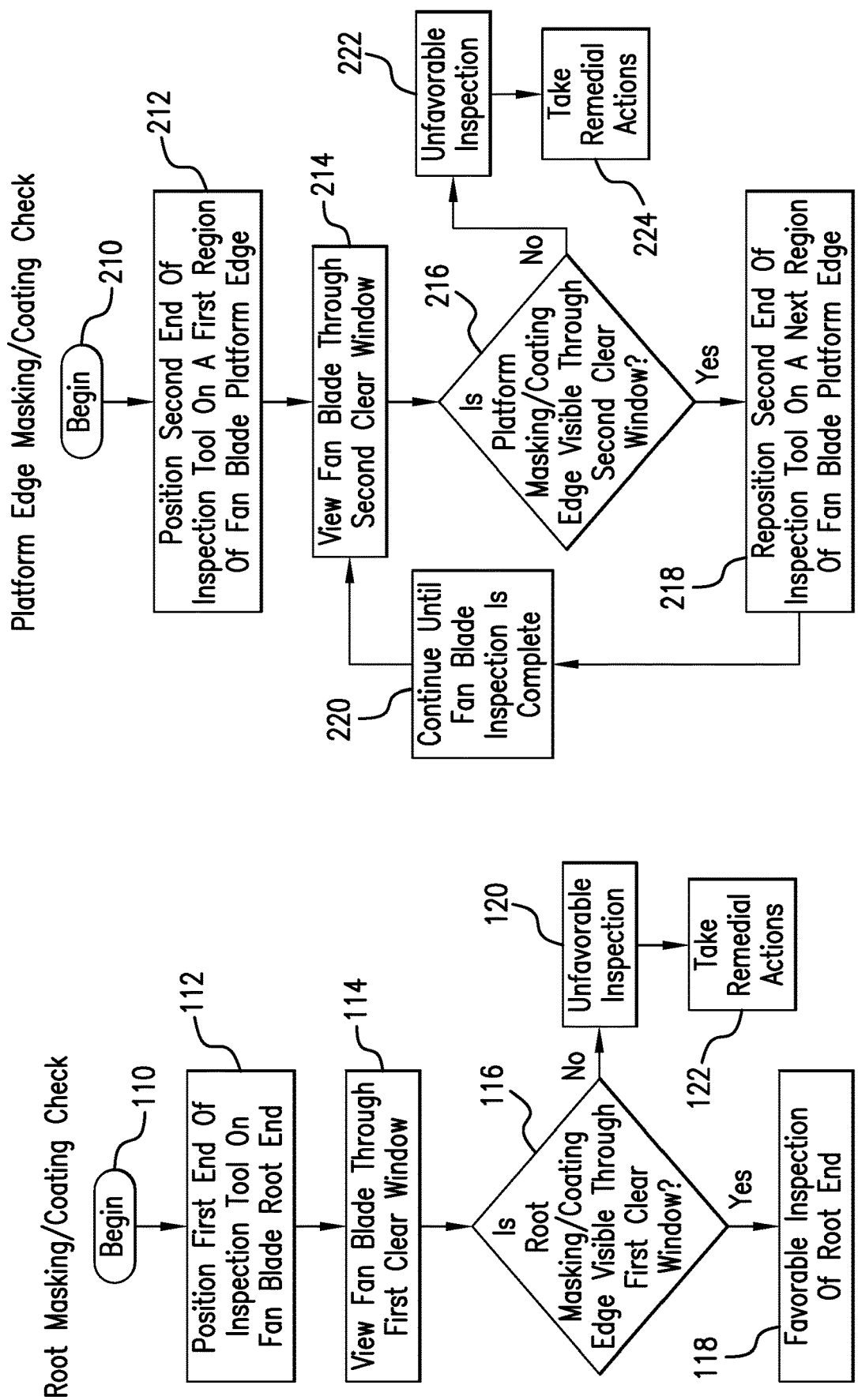

FAN BLADE MASKING/COATING CHECK INSPECTION TOOL

BACKGROUND

The present disclosure relates to inspection tools, and more particularly, to precision inspection tools for performing quality control inspections on gas turbine engine fan blades.

During the manufacturing of a gas turbine engine, individual fan blades are processed prior to their assembly into a fan assembly. Fan blades can be made of aluminum or an aluminum alloy, to which a chemical coating material is applied to minimize erosion and wear during operation of the gas turbine engine. As exemplary processing process applies a masking material to various regions on a fan blade to define the boundary of the subsequent coating material. The root region and platform edge are exemplary regions that can be masked and coated. Masking material can be applied by hand and then inspected to assure the boundaries of the masking material meets dimensional requirements. The chemical coating material is then applied, the masking material is removed, and the coating is inspected to assure the boundaries of the coating material meets dimensional requirements. In exemplary inspection processes involving the root and platform regions of a fan blade, metallic hand-held calipers are used to measure the distance from the root end to the root masking or coating edge, and from the platform edge to the platform masking or coating edge. Because the platform edge can span the length of the fan blade, multiple platform measurement locations are usually required. The inspector generally evaluates if each measurement lies within the tolerance band for the particular masking region, and if not, corrective action may be required to be taken. Because the masking material is soft it can be susceptible to damage during the inspection process, and damaged masking material can require corrective action. Similarly, the coating material is subject to damage during the inspection process, and damaged coating material can require corrective action. Metallic hand-held calipers can scratch the masking and/or coating material, which can require rework. Accordingly, the masking and coating inspection processes can be time-consuming.

SUMMARY

A masking/coating check inspection tool for inspecting a first masking/coating edge on a fan blade includes an elongate planar base having a first end, second end, bottom surface, top face, length, width, and thickness, the first and second ends opposite from each other and the length greater than the width; a pillar located between the first end and the second end, perpendicular to the elongate planar base and projecting upward from the top face, the pillar having a first end datum; and a first masking/coating check tolerance band located adjacent to the first end, configured to provide a pass/fail indication of the first masking/coating edge with respect to the first end datum.

A method of using a masking/coating check inspection tool for inspecting a root masking/coating edge on a root end of a fan blade, the masking/coating check inspection tool including an elongate planar base having a first end, second end, bottom surface, top face, length, width, and thickness, the first and second ends opposite from each other and the length greater than the width; a pillar located between the first end and the second end, perpendicular to the elongate planar base and projecting upward from the top face, the pillar having a first end datum; and a first masking/coating check tolerance band located adjacent to the first end, configured to provide a pass/fail indication of a first masking/coating edge with respect to the first end datum; the method including the steps of: (a) placing the first end in position on the root end, so that the first end datum contacts the root end; (b) viewing the root masking/coating edge relative to the first masking/coating check tolerance band; (c) evaluating whether the root masking/coating edge is within the first masking/coating check tolerance band; (d) indicating an favorable result if the root masking/coating edge is within the first masking/coating check tolerance band; and (e) indicating an unfavorable result if the root masking/coating edge is not within the first masking/coating check tolerance band.

A method of using a masking/coating check inspection tool for inspecting a platform masking/coating edge on a platform edge of a fan blade, the masking/coating check inspection tool including an elongate planar base having a first end, second end, bottom surface, top face, length, width, and thickness, the first and second ends opposite from each other and the length greater than the width; a pillar located between the first end and the second end, perpendicular to the elongate planar base and projecting upward from the top face, the pillar having a first end datum; a second masking/coating check tolerance band located adjacent to the second end, configured to provide a pass/fail indication of a second masking/coating edge with respect to the second end datum; the method including the steps of: (a) placing the second end in position on a first region of the platform edge, so that the second end datum contacts the platform edge; (b) viewing the platform masking/coating edge relative to the second masking/coating check tolerance band; (c) evaluating whether the platform masking/coating edge is within the second masking/coating check tolerance band; (d) indicating an unfavorable result if the platform masking/coating edge is not within the second masking/coating check tolerance band; (e) indicating a favorable result if the platform masking/coating edge is within the second masking/coating check tolerance band; (f) placing the second end in position on a next region of the platform edge, wherein the second end datum contacts the platform edge; and (g) repeating steps (b) through (f) as necessary.

BRIEF DESCRIPTION OF THE DRAWINGS

FIG. 5 is a flow chart depicting the process steps for inspecting the root area of a fan blade using the masking check inspection tool.

FIG. 6 is a flow chart depicting the process steps for inspecting the platform area of a fan blade using the masking check inspection tool.

DETAILED DESCRIPTION

The present disclosure provides a dual-purpose hand-held masking and coating check inspection tool for use in performing inspections on the masking and coating regions of gas turbine engine fan blades during manufacturing and processing, and a method of use thereof. Using the masking and coating check inspection tool of the present disclosure provides an inspector a rapid go/no-go check on whether the masking and/or coating materials on a fan blade is within a tolerance control band, avoiding the time-consuming process of dialing in a reading on hand-held calipers and then evaluating the measurement against a specification. As used in this disclosure, "masking/coating" will be used to refer to a process that evaluates a masking region and/or a coating region. The dual-purpose hand-held masking and coating check inspection tool can be referred to as a masking/coating check inspection tool, or simply as an inspection tool. The inspection tool of the present disclosure has two ends, either or both of which can be adapted for inspecting the masking/coating on various regions of a fan blade. The exemplary inspection tool of the present disclosure is adapted for a first end to be used for inspecting the root masking/coating region on a fan blade, and for the second end to be used for inspecting the platform masking/coating region on a fan blade. The inspection tool of the present disclosure can be used by an inspector, with the inspector being the person who uses the masking/coating check inspection tool for inspecting the masking and/or coating regions on a fan blade without regard to job title, or their level of training, qualification, and/or certification. Non-limiting examples of titles that can describe the person using the inspection tool include operator, quality assurance (QA) inspector, and quality control (QC) inspector.

Figure 1A:
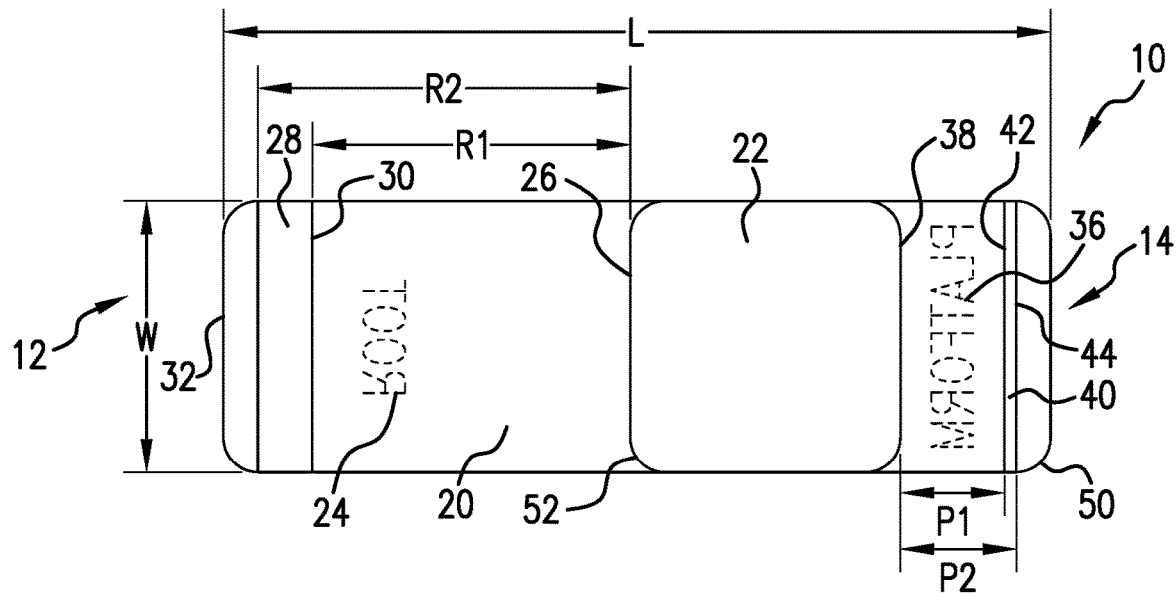
FIG. 1A is a bottom plan view of a masking check inspection tool.
Figure 1B:
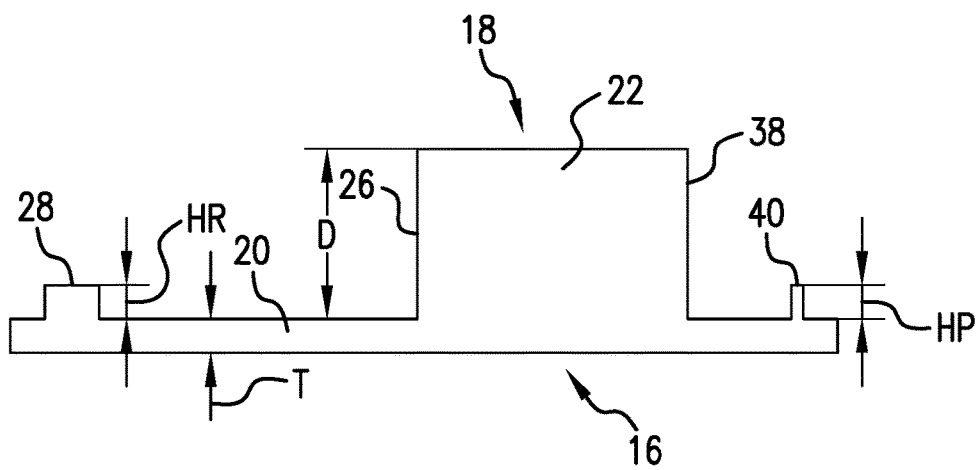
FIG. 1B is a side plan view of the masking check inspection tool shown in FIG. 1A.

FIG. 1A is a bottom plan view of inspection tool 10, and FIG. 1B is a side plan view of inspection tool 10. Shown in FIGS. 1A-1B are inspection tool 10, root end 12, platform end 14, bottom surface 16, top face 18, base 20, pillar 22, root label 24, root datum 26, root ridge 28, root near-edge 30, root far-edge 32, platform label 36, platform datum 38, platform ridge 40, platform near-edge 42, platform far-edge 44, base corner 50, and pillar corner 52. Also shown in FIGS. 1A-1B are dimensions including length L, width W, thickness T, pillar height D, root minimum dimension R1, root maximum dimension R2, platform ridge height HP, platform minimum dimension P1, platform maximum dimension P2, and root ridge height HR.

Inspection tool 10 defines two ends that are opposite, or distal, from each other: root end 12, and platform end 14. As noted, the exemplary inspection tool 10 depicted in FIGS. 1A-1B is desired for inspecting the root masking area and platform masking area of an exemplary fan blade (not shown). Root end 12 can also be referred to as a first end, and platform end 14 can also be referred to as a second end. Inspection tool 10 defines bottom surface 16 and top face 18, with base 20 defining the footprint of inspection tool 10. Base 20 has dimensions of length L, width W, and thickness T. Length L is greater than width W, thereby giving base 20 an elongate structure. Bottom surface 16 is substantially planar, and several features protrude from top face 18 including pillar 22, root ridge 28, and platform ridge 40. In the illustrated embodiment pillar 22 is square as viewed from the top, having side dimensions of width W and pillar height D. Pillar corners 52 are radiused corners on the vertical corners of pillar 22. In the illustrated embodiment, inspection tool 10 is made from clear acrylic. Root end 12 is marked with root label 24, and platform end 14 is marked with platform label 36. In the illustrated embodiment, root label 24 uses the word "ROOT" and platform label 36 uses the word "PLATFORM", both in mirrored lettering. In the illustrated embodiment, root label 24 and platform label 36 are engraved in the surface of top face 18. In other embodiments, root label 24 and/or platform label 36 could be made by applying a label to top face 18. The reason for mirrored lettering is so that these words are readable when viewed through bottom surface 16, as will be described in FIGS. 2-4. In some embodiments, root label 24 and platform label 36 can be different words or marks that correspond with the first end and the second end, respectively. In other embodiments, root label 24 and platform label 36 can be omitted. In yet other embodiments, inspection tool 10 can be made from other materials. In some of these embodiments, inspection tool 10 can be made from two or more different materials that are joined together. Of these two or more different materials, some can be clear and others can be clouded and/or opaque. Non-limiting examples of other materials can include plastic, resin, glass, fiberglass, metal, metallic alloys, and composites thereof. In some of these embodiments, one or more regions of inspection tool 10 can be coated with materials that reduce or prevent damage to the fan blade and/or the masking materials.

Referring again to FIGS. 1A-1B, root datum 26 is the vertical edge of pillar 22 that faces toward root end 12, and platform datum 38 is the vertical edge of pillar 22 that faces toward platform end 14. Root ridge 28 projects upward from top face 18. The vertical edge of root ridge 28 nearest root datum 26 is root near-edge 30, and the vertical edge of root ridge 28 furthest from root datum 26 is root far-edge 32. The distance from root datum 26 to root near-edge 30 is root minimum dimension R1, and the distance from root datum 26 to root far-edge 32 is root maximum dimension R2. Root ridge height HR is the height of root ridge 28 above top face 18. Similarly, platform ridge 40 projects upward from top face 18. The vertical edge of platform ridge 40 nearest platform datum 38 is platform near-edge 42, and the vertical edge of platform ridge 40 furthest from platform datum 38 is platform far-edge 44. The distance from platform datum 38 to platform near-edge 42 is platform minimum dimension P1, and the distance from platform datum 38 to platform far-edge 44 is platform maximum dimension P2. Platform ridge height HP is the height of platform ridge 40 above top face 18. Root ridge 28 could also be referred to as a first ridge, and platform ridge 40 could also be referred to as a second ridge. Accordingly, in this parlance, all features related to a first ridge would be appropriately renamed (e.g., first label, first datum, first near-end, first far-end, and so on). Similarly, all features related to a second ridge would also be appropriately renamed.

Root ridge 28 and platform ridge 40 are both optically clear, so that they can be seen through. As will be described in FIGS. 3-4, an inspector will use inspection tool 10 by looking through root ridge 28 and platform ridge 40 in different operations. In the illustrated embodiment, the remaining portions of top face 18 are cloudy or translucent. For example, an industrial or household scouring pad could be used to cloud the surface of top face 18 by rubbing top face 18 with the scouring pad. In some embodiments, the surface of top face 18 could be clouded by using an abrasive material such as sandpaper, or by chemical or mechanical etching. In the illustrated embodiment, a clouded finish on top face 18 can enhance the readability of root label 24 and platform label 36, and/or highlight the surface areas of root ridge 28 and platform ridge 40. In some embodiments, base 20 could be a material that is cloudy or translucent. In other embodiments, base 20 could be an opaque material. In these other embodiments, root label 24 and platform label 36 could be placed on bottom surface 16 to be seen when viewing inspection tool 10 from bottom surface 16. In yet other embodiments, base 20 could be clear.

The dimensions of inspection tool 10 will depend on the particular fan blade to be inspected. In a non-limiting exemplary embodiment of inspection tool 10 for use on a particular 30,000 rpm fan blade, the following dimensions can be used. Length L is 3.05 in. (7.747 cm), width W is 1.00 in. (2.540 cm), thickness T is 0.13 in. (0.330 cm), and pillar height D is 0.62 in. (1.575 cm). Pillar 22 is square, with the dimension of each of the four sides being 1.00 in. (2.540 cm), the same as width W. Root ridge height HR is 0.12 in. (0.305 cm), root minimum dimension R1 is 1.170 in. (2.9718 cm), and root maximum dimension R2 is 1.370 in. (3.4798 cm). Pillar ridge height HP is 0.12 in. (0.305 cm), pillar minimum dimension P1 is 0.383 in. (0.9728 cm), and pillar maximum dimension P2 is 0.423 in. (1.0744 cm). All base corners 50 and pillar corners 52 have a radius of 0.13 in. (0.330 cm). In some embodiments, the radius of base corners 50 and pillar corners 52 can be greater than or less than 0.13 in. (0.330 cm). In other embodiments, some or all of base corners 50 and/or pillar corners 52 can have radii that are different from each other. In a particular embodiment, an advantage of base corners 50 and/or pillar corners 52 is to reduce their sharpness, which can have at least two beneficial results: inspection tool 10 can be easier for an inspector to handle, and the risk of inspection tool 10 damaging fan blade masking regions during the inspection process is reduced.

In some embodiments, some or all of the dimensions of inspection tool 10 can be different from those given above. For example, in performing inspection of the aforementioned exemplary fan blade, root minimum dimension R1, root maximum dimension R2, pillar minimum dimension P1, and pillar maximum dimension P2 can be deemed to be critical dimensions, with all other dimensions being non-critical. Accordingly, some or all of the non-critical dimensions could be different, either greater than or less than those provided above. Moreover, in some embodiments, the critical dimensions of inspection tool 10 could be changed for use in inspecting the same exemplary fan blade given above. For example, design changes made to the fan blade and/or the fan that is made from multiple fan blades could require different masking patterns, and therefore, a change in the masking inspection criteria.

In other embodiments, inspection tool 10 could be adapted for inspecting a fan blade that is different from the exemplary fan blade described above, and which could therefore have different masking requirements. In some of these other embodiments, inspection tool 10 could be required for inspecting only one masking dimension on a fan blade. For example, another exemplary fan blade may require masking on only the root region. Accordingly, in another embodiment of inspection tool 10 that accommodates this other exemplary fan blade, only root end 12 can be necessary on inspection tool 10. Therefore, in this other embodiment, platform end 14 can be omitted from inspection tool 10. In yet another embodiment, root end 12 could be omitted from inspection tool 12. Moreover, as noted above, in these or any other embodiments, root end 12 and/or platform end 14 could be labeled with any appropriate label that represents the particular masking region being inspected.

Figure 2:
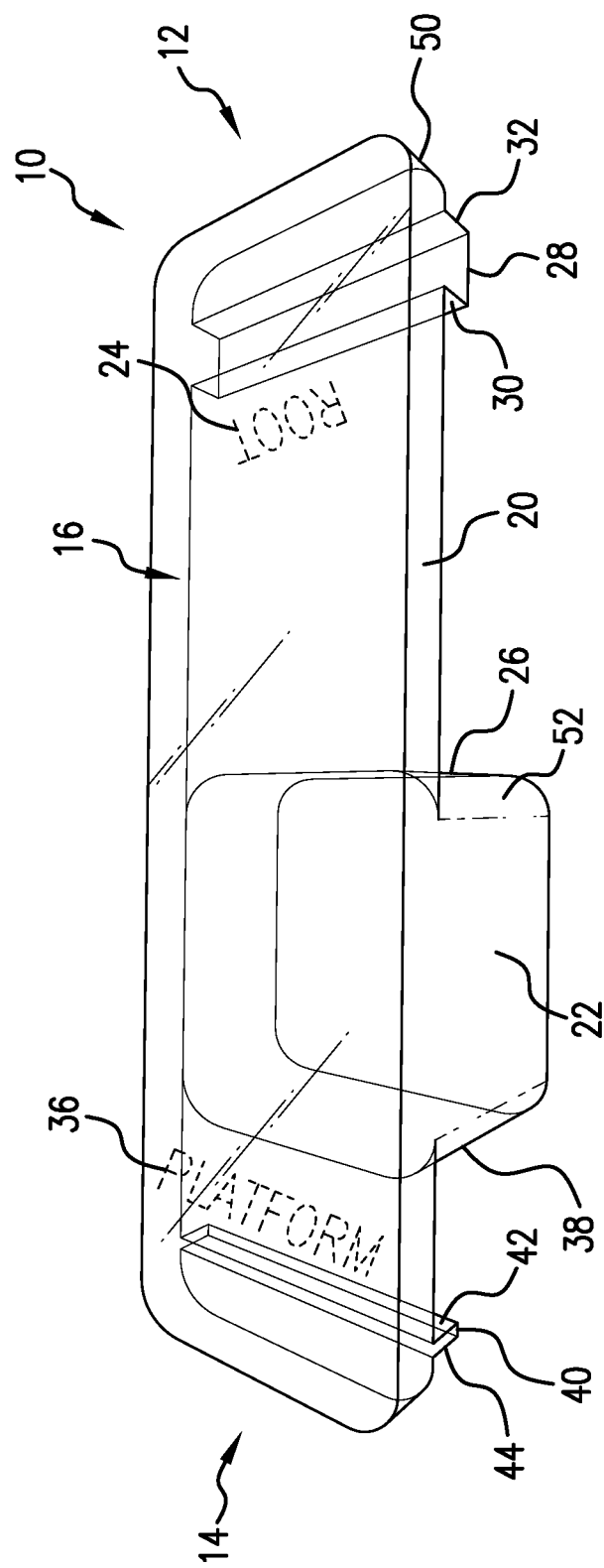
FIG. 2 is a side perspective view of the masking check inspection tool shown in FIGS. 1A-1B.

FIG. 2 is a side perspective view of masking check inspection tool 10 shown in FIGS. 1A-1B. The features shown in FIG. 2 are as described in FIGS. 1A-1B. FIG. 2 depicts inspection tool 10 in the position of use, with bottom surface 16 facing up. As shown in FIG. 2, the words of root label 24 and platform label 36 appear normal because the mirrored lettering that is engraved in top face 18 is being seen through bottom surface 16.

Figure 3:
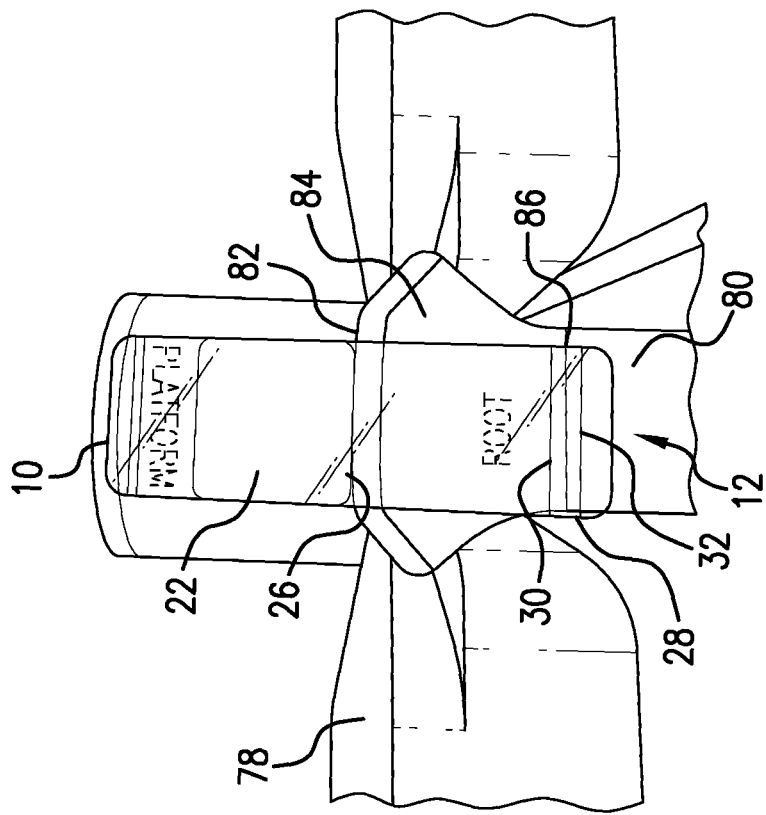
FIG. 3 is a perspective view of the masking check inspection tool in position on the root area of a fan blade.

FIG. 3 is a perspective view of inspection tool 10 in position on the root area of a fan blade. Shown in FIG. 3 are inspection tool 10, root end 12, pillar 22, root datum 26, root ridge 28, root near-edge 30, root far-edge 32, carousel 78, fan blade 80, blade root end 82, root masking region 84, and root masking edge 86. Carousel 78 is used to hold fan blade 80 during a portion of the manufacturing and inspection process. Fan blade 80 is supported from root end 82 which hangs from carousel 78. During an inspection process, root masking region 84 is to be inspected by an inspector using inspection tool 10 to determine if root masking edge 86 lies within the specified dimensional requirements. As shown in FIG. 3, width W (not labeled) of masking check inspection tool 10 allows inspection tool 10 to not interfere with carousel 78. It can be otherwise beneficial that width W maximizes the field of view of root masking edge 86 through root ridge 28. Inspection tool 10 is positioned with pillar 22 directed away from the inspector, and is placed in contact with fan blade 80 with root end 12 being positioned toward fan blade 80. Therefore, the inspector will look through inspection tool 10 from bottom surface 16. Root datum 26 is in contact with blade root end 82. In the illustrated embodiment, root masking edge 86 is visible through root ridge 20, meaning that root masking edge 86 lies between root near-edge 30 and root far-edge 32. As was described in FIGS. 1A-1B, this means that root masking edge 86 lies between the dimensions that correspond to root minimum dimension R1 and root maximum dimension R2. In the illustrated embodiment, fan blade 80 could therefore be identified by the inspector as meeting the specification requirements for root masking edge 86. Alternatively, if root masking edge 86 does not lie between root near-edge 30 and root far-edge 32, an unfavorable inspection is indicated and remedial actions can be taken. Non-limiting examples of remedial actions can include re-working root masking region 84 and/or providing corrective feedback to the process by which root masking region 84 is applied to fan blade 80.

The foregoing description involved the use of inspection tool 10 for inspecting root masking edge 86 of root masking region 84. As noted above, inspection tool 10 can be used for inspecting the edges of masking and/or coating regions. Therefore, in a different embodiment, carousel 78 could be used to support fan blade 80 having a root coating region (not labeled). Accordingly, inspection tool 10 could be used to inspect a root coating edge (not labeled).

Figure 4:
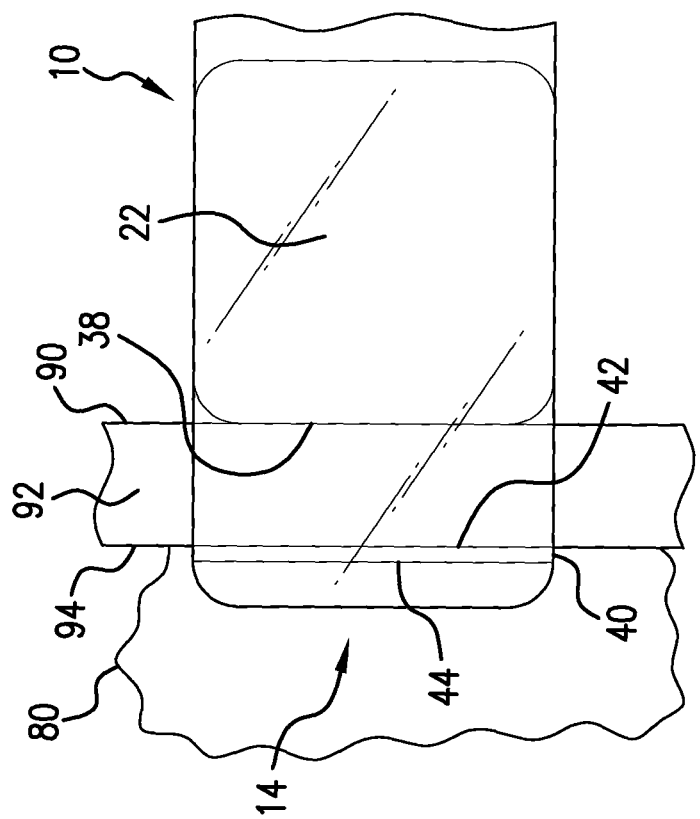
FIG. 4 is a perspective view of the masking check inspection tool in position on the platform area of a fan blade.

FIG. 4 is a perspective view of masking check inspection tool 10 in position on the platform area of a fan blade. Shown in FIG. 4 are inspection tool 10, platform end 14, pillar 22, platform datum 38, platform ridge 40, platform near-edge 42, platform far-edge 44, fan blade 80, blade platform edge 90, platform masking region 92, and platform masking edge 94. Carousel 78 (not shown) can be used to support fan blade 80 as described in FIG. 3. During an inspection process, platform masking region 92 is to be inspected by an inspector by using inspection tool 10 to determine if platform masking edge 94 lies within the specified dimensional requirements. Inspection tool 10 is positioned with pillar 22 directed away from the inspector, and is placed in contact with fan blade 80 with platform end 14 being positioned toward fan blade 80. Platform datum 38 is in contact with blade platform edge 90. Therefore, the inspector will look through inspection tool 10 from bottom surface 16. In the illustrated embodiment, platform masking edge 94 is visible through platform ridge 40, meaning that platform masking edge 94 lies between platform near-edge 42 and platform far-edge 44. As was described in FIGS. 1A-1B, this means that platform masking edge 92 lies between the dimensions that correspond to platform minimum dimension P1 and platform maximum dimension P2. In the illustrated embodiment, fan blade 80 could be identified by the inspector as meeting the specification requirements for platform masking edge 94 in the particular region being inspected.

It should be noted that in the illustrated embodiment the length (not shown) of platform masking region 92 can be greater than the width (not shown) of root masking region 84. Accordingly, a single inspection of platform masking edge 94 can be insufficient in some instances and multiple inspections can be required along the length of platform masking region 92. For example, in a particular situation, three inspections can be performed on platform masking edge 94: one inspection at each end, and a third approximately in the center. In a particular inspection process using hand-held calipers, the three aforementioned inspection points were used. Therefore, inspection tool 10 can be used to inspect platform masking edge 94 in approximately the same three aforementioned locations.

In an exemplary inspection scenario, all inspections performed on platform masking region 92 maybe required to be acceptable for fan blade 80 to be deemed satisfactory. Therefore, if platform masking edge 94 does not lie between platform near-edge 42 and platform far-edge 44 during the inspection of any region of platform masking edge 94, then an unfavorable inspection result is indicated and remedial actions can be taken. Non-limiting examples of remedial actions can include re-working platform masking region 92 and/or providing corrective feedback to the process by which platform masking region 92 is applied to fan blade 80.

It is noteworthy that using inspection tool 10 significantly reduces the inspection time compared to that of using hand-held calipers. Also, because using hand-held calipers can present a danger of damaging platform masking region 92 through contact with the hand-held calipers, it could be advantageous to minimize the number of inspection points using hand-held calipers to minimize the risk of damage thereof. By using inspection tool 10 the risk of damage to platform masking edge 94 is significantly reduced compared to that of using hand-held calipers for one or more reasons that are described as follows. Top face 18 and platform ridge 40 are relatively large surfaces compared to the tips of hand-held calipers, and the risk of damage to platform masking region 92 is therefore reduced because the contact force can be distributed over a larger contact area. Inspection tool 10 can be made from acrylic material, which can reduce the risk of damage to platform masking region 92 as compared to metallic hand-held calipers. Moreover, inspection tool 10 can have radiused base corners 50 which can further reduce the risk of damage to platform masking region 92. Because inspection tool 10 presents a lower risk of damage to masking region 92 and/or because the inspection time using inspection tool 10 is shorter as compared to using hand-held calipers, an inspector can perform a greater number of inspections along the length of platform masking region 92. Accordingly, a more capable inspection of platform masking region 92 can be provided in a shorter period of time by using inspection tool 10 as compared to performing an inspection using hand-held calipers.

The foregoing description involved the use of inspection tool 10 for inspecting platform masking edge 94 of platform masking region 92. As noted above, inspection tool 10 can be used for inspecting the edge of a masking and/or coating region. Therefore, in a different embodiment, carousel 78 could be used to support fan blade 80 having a platform coating region (not labeled). Accordingly, inspection tool 10 could be used to inspect a platform coating edge (not labeled).

FIG. 5 is a flow chart depicting the process steps for inspecting root masking edge 86 of fan blade 80 using inspection tool 10. Shown in FIG. 5 are the following process steps: begin inspection step 110, position inspection tool step 112, visual inspection step 114, edge visibility decision step 116, favorable inspection step 118, unfavorable inspection step 120, and remedial actions step 122. In the illustrated embodiment, inspection of root masking region 84 starts at begin inspection step 110 which is predicated on fan blade 80 being properly positioned in carousel 78 as described in FIG. 3. In position inspection tool step 112, the inspector places inspection tool 10 in position on root end 82 of fan blade 80 as shown in FIG. 3. In visual inspection step 114, the inspector looks through root ridge 28 at root masking edge 86 of root masking region 84. In edge visibility decision step 116, the inspector determines if root masking edge 86 lies between root near-edge 30 and root far-edge 32 as described in FIG. 3, with edge visibility decision step 116 having a yes/no outcome. If the outcome is "yes", then the inspection process ends at favorable inspection step 118. However, if the outcome is "no", then unfavorable inspection step 120 occurs, and one or more corrective actions can be taken in remedial actions step 122. It should be noted that other inspections can also occur during the process depicted in FIG. 5. For example, in some embodiments, the inspector will visually inspect the integrity of root masking region 84 for scratched or missing masking material, or for other problems that could exist with root masking region 84.

As described in FIG. 3, inspection tool 10 can be used for inspecting the edge of a masking and/or coating region. Accordingly, a process for inspecting a root coating edge of fan blade 80 could use the flow chart of FIG. 5 with an appropriately modified description.

FIG. 6 is a flow chart depicting the process steps for inspecting platform masking edge 94 of fan blade 80 using masking check inspection tool 10. Shown in FIG. 6 are the following process steps: begin inspection step 210, position inspection tool step 212, visual inspection step 214, edge visibility decision step 216, reposition inspection tool step 218, continue inspection step 220, unfavorable inspection step 222, and remedial actions step 224. In the illustrated embodiment, inspection of platform masking region 92 starts at begin inspection step 210 which is predicated on fan blade 80 being properly positioned in carousel 78 as described in FIGS. 3-4. In position inspection tool step 212, the inspector places inspection tool 10 in position on a particular region of platform edge 90 of fan blade 80 as shown in FIG. 4. In visual inspection step 214, the inspector looks through platform ridge 40 at platform masking edge 94 of platform masking region 92. In edge visibility decision step 216, the inspector determines if platform masking edge 94 lies between platform near-edge 42 and platform far-edge 44 as described in FIG. 4, with edge visibility decision step 216 having a yes/no outcome. If the outcome is "yes", then the inspector repositions inspection tool 10 to a next region of platform edge 90 in reposition inspection tool step 218. Next, the inspector looks through platform ridge 40 at a next region of platform edge 90 and repeats visual inspection step 214. Continue inspection step 220 causes the inspector to repeatedly inspect subsequent regions of platform edge 90 as dictated by the sampling scheme that exists. If at any point in these repeated inspections the inspector does not view platform masking edge 94 through platform ridge 40, then the outcome of edge visibility decision step 216 is "no" and unfavorable inspection step 222 occurs. Next, one or more corrective actions can be taken in remedial actions step 224. It should be noted that other inspections can also occur during the process depicted in FIG. 6. For example, in some embodiments, the inspector will visually inspect the integrity of platform masking region 92 for scratched or missing masking material, or for other problems that could exist with platform masking region 92.

As described in FIG. 4, inspection tool 10 can be used for inspecting the edge of a masking and/or coating region. Accordingly, a process for inspecting a platform coating edge of fan blade 80 could use the flow chart of FIG. 6 with an appropriately modified description.

In describing inspection tool 10 and the methods of use, an exemplary 30,000 rpm fan blade was used to provide exemplary dimensions for inspection tool 10. Moreover, a double-ended design was used in which a first end and a second end are dimensioned for inspecting two different masking/coating regions. All fan blades that include masking/coating regions during any manufacturing or repair process are within the scope of the present disclosure, including all designs of 30,000 rpm fan blades and other fan blades. For example, inspections of 24,000 rpm fan blades are within the scope of the present disclosure. Moreover, all fan blades having a single masking/coating region are included in the scope of the present disclosure. In the situation where a fan blade has a single masking/coating region, then a particular embodiment of inspection tool 10 can have only a first ridge and associated first markings and dimensions, as described above under FIGS. 1A-1B.

Discussion of Possible Embodiments

The following are non-exclusive descriptions of possible embodiments of the present invention.

A masking/coating check inspection tool for inspecting a first masking/coating edge on a fan blade, the masking/coating check inspection tool comprising an elongate planar base having a first end, second end, bottom surface, top face, length, width, and thickness, the first and second ends distal from each other and the length greater than the width; a pillar disposed between the first end and the second end, perpendicular to the elongate planar base and projecting upward from the top face, the pillar having a first end datum; and a first masking/coating check tolerance band disposed adjacent to the first end, configured to provide a pass/fail indication of the first masking/coating edge with respect to the first end datum.

The masking/coating check inspection tool of the preceding paragraph can optionally include, additionally and/or alternatively, any one or more of the following features, configurations and/or additional components:

A further embodiment of the foregoing masking/coating check inspection tool, wherein the first masking/coating check tolerance band is configured to have a near-edge and a far-edge; the near-edge is configured to correspond with a first masking/coating minimum dimension on the fan blade; and the far-edge is configured to correspond with a first masking/coating maximum dimension on the fan blade.

A further embodiment of the foregoing masking/coating check inspection tool, further comprising a first ridge, wherein the first ridge extends from the top face; the first ridge is a clear material; and the first ridge corresponds to the first masking/coating check tolerance band.

A further embodiment of the foregoing masking/coating check inspection tool, wherein the pillar further comprises a second end datum; and a second masking/coating check tolerance band is disposed adjacent to the second end, configured to provide a pass/fail indication of a second masking/coating edge with respect to the second end datum.

A further embodiment of the foregoing masking/coating check inspection tool, further comprising a second ridge, wherein the second ridge extends from the top face; the second ridge is a clear material; and the second ridge corresponds to the second masking/coating check tolerance band.

A further embodiment of the foregoing masking/coating check inspection tool, wherein the elongate planar base is a clear material; and at least a portion of the top face has a clouded surface.

A further embodiment of the foregoing masking/coating check inspection tool, wherein the clear material is acrylic.

A further embodiment of the foregoing masking/coating check inspection tool, wherein the first masking/coating check tolerance band is configured to accommodate a fan blade root masking/coating edge.

A further embodiment of the foregoing masking/coating check inspection tool, wherein the second masking/coating check tolerance band is configured to accommodate a fan blade platform masking/coating edge.

A further embodiment of the foregoing masking/coating check inspection tool, wherein the elongate planar base further comprises radiused corners.

A further embodiment of the foregoing masking/coating check inspection tool, wherein the length is 3.05 in. (7.747 cm); the width is 1.00 in. (2.540 cm); the thickness is 0.13 in. (0.33 cm); the radiused corners have a radius of 0.13 in. (0.33 cm); and the pillar has a pillar height of 0.62 in. (1.575 cm).

A further embodiment of the foregoing masking/coating check inspection tool, wherein the first masking/coating check tolerance band is 1.170-1.370 in. (2.9718-3.4798 cm).

A further embodiment of the foregoing masking/coating check inspection tool, wherein second masking/coating check tolerance band is 0.383-0.423 in. (0.9728-1.0744 cm).

A further embodiment of the foregoing masking/coating check inspection tool, wherein the first ridge has a height of 0.12 in. (0.305 cm).

A further embodiment of the foregoing masking/coating check inspection tool, wherein the second ridge has a height of 0.12 in. (0.305 cm).

A further embodiment of the foregoing masking/coating check inspection tool, wherein the fan blade is a component in a 30,000 rpm gas turbine fan.

A method of using a masking/coating check inspection tool for inspecting a root masking/coating edge on a root end of a fan blade, the masking/coating check inspection tool comprising an elongate planar base having a first end, second end, bottom surface, top face, length, width, and thickness, the first and second ends distal from each other and the length greater than the width; a pillar disposed between the first end and the second end, perpendicular to the elongate planar base and projecting upward from the top face, the pillar having a first end datum; and a first masking/coating check tolerance band disposed adjacent to the first end, configured to provide a pass/fail indication of a first masking/coating edge with respect to the first end datum; the method comprising the steps of: (a) placing the first end in position on the root end, wherein the first end datum contacts the root end; (b) viewing the root masking/coating edge relative to the first masking/coating check tolerance band; (c) evaluating whether the root masking/coating edge is within the first masking/coating check tolerance band; (d) indicating an favorable result if the root masking/coating edge is within the first masking/coating check tolerance band; and (e) indicating an unfavorable result if the root masking/coating edge is not within the first masking/coating check tolerance band.

The method of the preceding paragraph can optionally include, additionally and/or alternatively, any one or more of the following features, configurations and/or additional components:

A further embodiment of the foregoing method, further comprising taking a remedial action if the root masking/coating edge is not within the first masking/coating check tolerance band, wherein the remedial action comprises one or more of re-working the root masking/coating edge and providing process feedback.

A method of using a masking/coating check inspection tool for inspecting a platform masking/coating edge on a platform edge of a fan blade, the masking/coating check inspection tool comprising an elongate planar base having a first end, second end, bottom surface, top face, length, width, and thickness, the first and second ends distal from each other and the length greater than the width; a pillar disposed between the first end and the second end, perpendicular to the elongate planar base and projecting upward from the top face, the pillar having a first end datum; a second masking/coating check tolerance band disposed adjacent to the second end, configured to provide a pass/fail indication of a second masking/coating edge with respect to the second end datum; the method comprising the steps of: (a) placing the second end in position on a first region of the platform edge, wherein the second end datum contacts the platform edge; (b) viewing the platform masking/coating edge relative to the second masking/coating check tolerance band; (c) evaluating whether the platform masking/coating edge is within the second masking/coating check tolerance band; (d) indicating an unfavorable result if the platform masking/coating edge is not within the second masking/coating check tolerance band; (e) indicating a favorable result if the platform masking/coating edge is within the second masking/coating check tolerance band; (f) placing the second end in position on a next region of the platform edge, wherein the second end datum contacts the platform edge; and (g) repeating steps (b) through (f) as necessary.

The method of the preceding paragraph can optionally include, additionally and/or alternatively, any one or more of the following features, configurations and/or additional components:

A further embodiment of the foregoing method, further comprising taking a remedial action if the platform masking/coating edge is not within the second masking/coating check tolerance band, wherein the remedial action comprises one or more of re-working the platform masking/coating edge and providing process feedback.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A masking/coating check inspection tool for inspecting a first masking/coating edge on a fan blade, the masking/coating check inspection tool comprising:
    an elongate planar base having a first end, second end, bottom surface, top face, length, width, and thickness, the first and second ends distal from each other and the length greater than the width;
    a pillar disposed between the first end and the second end, perpendicular to the elongate planar base and projecting upward from the top face, the pillar having a first end datum; and
    a first masking/coating check tolerance band disposed adjacent to the first end, configured to provide a pass/fail indication of the first masking/coating edge with respect to the first end datum.

2. The masking/coating check inspection tool of claim 1, wherein:
    the first masking/coating check tolerance band is configured to have a near-edge and a far-edge;
    the near-edge is configured to correspond with a first masking/coating minimum dimension on the fan blade; and
    the far-edge is configured to correspond with a first masking/coating maximum dimension on the fan blade.

3. The masking/coating check inspection tool of claim 2, further comprising a first ridge, wherein:
    the first ridge extends from the top face;
    the first ridge is a clear material; and
    the first ridge corresponds to the first masking/coating check tolerance band.

4. The masking/coating check inspection tool of claim 2, wherein:
    the pillar further comprises a second end datum; and
    a second masking/coating check tolerance band is disposed adjacent to the second end, configured to provide a pass/fail indication of a second masking/coating edge with respect to the second end datum.

5. The masking/coating check inspection tool of claim 4, further comprising a second ridge, wherein:
    the second ridge extends from the top face;
    the second ridge is a clear material; and
    the second ridge corresponds to the second masking/coating check tolerance band.

6. The masking/coating check inspection tool of claim 1, wherein:
    the elongate planar base is a clear material; and
    at least a portion of the top face has a clouded surface.

7. The masking/coating check inspection tool of claim 6, wherein the clear material is acrylic.

8. The masking/coating check inspection tool of claim 2, wherein the first masking/coating check tolerance band is configured to accommodate a fan blade root masking/coating edge.

9. The masking/coating check inspection tool of claim 4, wherein the second masking/coating check tolerance band is configured to accommodate a fan blade platform masking/coating edge.

10. The masking/coating check inspection tool of claim 4, wherein the elongate planar base further comprises radiused corners.

11. The masking/coating check inspection tool of claim 10, wherein:
   the length is 3.05 in. (7.747 cm);
   the width is 1.00 in. (2.540 cm);
   the thickness is 0.13 in. (0.33 cm);
   the radiused corners have a radius of 0.13 in. (0.33 cm); and
   the pillar has a pillar height of 0.62 in. (1.575 cm).

12. The masking/coating check inspection tool of claim 8, wherein the first masking/coating check tolerance band is 1.170-1.370 in. (2.9718-3.4798 cm).

13. The masking/coating check inspection tool of claim 9, wherein second masking/coating check tolerance band is 0.383-0.423 in. (0.9728-1.0744 cm).

14. The masking/coating check inspection tool of claim 3, wherein the first ridge has a height of 0.12 in. (0.305 cm).

15. The masking/coating check inspection tool of claim 5, wherein the second ridge has a height of 0.12 in. (0.305 cm).

16. The masking/coating check inspection tool of claim 12, wherein the fan blade is a component in a 30,000 rpm gas turbine fan.

17. A method of using a masking/coating check inspection tool for inspecting a root masking/coating edge on a root end of a fan blade, the masking/coating check inspection tool comprising:
   an elongate planar base having a first end, second end, bottom surface, top face, length, width, and thickness, the first and second ends distal from each other and the length greater than the width;
   a pillar disposed between the first end and the second end, perpendicular to the elongate planar base and projecting upward from the top face, the pillar having a first end datum; and
   a first masking/coating check tolerance band disposed adjacent to the first end, configured to provide a pass/fail indication of a first masking/coating edge with respect to the first end datum;
   the method comprising the steps of:
      (a) placing the first end in position on the root end, wherein the first end datum contacts the root end;
      (b) viewing the root masking/coating edge relative to the first masking/coating check tolerance band;
      (c) evaluating whether the root masking/coating edge is within the first masking/coating check tolerance band;
      (d) indicating an favorable result if the root masking/coating edge is within the first masking/coating check tolerance band; and
      (e) indicating an unfavorable result if the root masking/coating edge is not within the first masking/coating check tolerance band.

18. The method of claim 17, further comprising taking a remedial action if the root masking/coating edge is not within the first masking/coating check tolerance band, wherein the remedial action comprises one or more of re-working the root masking/coating edge and providing process feedback.

19. A method of using a masking/coating check inspection tool for inspecting a platform masking/coating edge on a platform edge of a fan blade, the masking/coating check inspection tool comprising:
   an elongate planar base having a first end, second end, bottom surface, top face, length, width, and thickness, the first and second ends distal from each other and the length greater than the width;
   a pillar disposed between the first end and the second end, perpendicular to the elongate planar base and projecting upward from the top face, the pillar having a first end datum;
   a second masking/coating check tolerance band disposed adjacent to the second end, configured to provide a pass/fail indication of a second masking/coating edge with respect to the second end datum;
   the method comprising the steps of:
      (a) placing the second end in position on a first region of the platform edge, wherein the second end datum contacts the platform edge;
      (b) viewing the platform masking/coating edge relative to the second masking/coating check tolerance band;
      (c) evaluating whether the platform masking/coating edge is within the second masking/coating check tolerance band;
      (d) indicating an unfavorable result if the platform masking/coating edge is not within the second masking/coating check tolerance band;
      (e) indicating a favorable result if the platform masking/coating edge is within the second masking/coating check tolerance band;
      (f) placing the second end in position on a next region of the platform edge, wherein the second end datum contacts the platform edge; and
      (g) repeating steps (b) through (f) as necessary.

20. The method of claim 19, further comprising taking a remedial action if the platform masking/coating edge is not within the second masking/coating check tolerance band, wherein the remedial action comprises one or more of re-working the platform masking/coating edge and providing process feedback.

* * * * *